United States Patent
Dahari

(10) Patent No.: US 9,175,995 B2
(45) Date of Patent: Nov. 3, 2015

(54) INFERENTIAL CORIOLIS MASS FLOWMETER FOR DETERMINING A MASS FLOWRATE OF A FLUID BY USING ALGORITHM DERIVED PARTIALLY FROM CORIOLIS FORCE

(75) Inventor: Mahidzal Dahari, Kuala Lumpur (MY)

(73) Assignee: Universiti Malaya, Kuala Lumpur (MY)

( * ) Notice: Subject to any disclaimer, the term of this patent is extended or adjusted under 35 U.S.C. 154(b) by 69 days.

(21) Appl. No.: 14/239,823

(22) PCT Filed: Aug. 17, 2012

(86) PCT No.: PCT/MY2012/000235
§ 371 (c)(1),
(2), (4) Date: Feb. 20, 2014

(87) PCT Pub. No.: WO2013/028062
PCT Pub. Date: Feb. 28, 2013

(65) Prior Publication Data
US 2014/0190274 A1 Jul. 10, 2014

(30) Foreign Application Priority Data
Aug. 22, 2011 (MY) .............................. 2011003939

(51) Int. Cl.
*G01F 9/00* (2006.01)
*G01F 1/84* (2006.01)
(52) U.S. Cl.
CPC .............. *G01F 9/001* (2013.01); *G01F 1/8427* (2013.01); *G01F 1/8431* (2013.01); *G01F 1/8436* (2013.01)
(58) Field of Classification Search
None
See application file for complete search history.

(56) References Cited

U.S. PATENT DOCUMENTS

| 4,911,006 A | 3/1990 | Hargarten et al. |
| 5,321,991 A | 6/1994 | Kalotay |
| 5,473,949 A | 12/1995 | Cage et al. |
| 5,969,264 A | 10/1999 | Rivkin |
| 7,343,822 B2 * | 3/2008 | Kolahi et al. ............ 73/861.357 |
| 7,654,156 B1 * | 2/2010 | Aikins et al. ............... 73/861.63 |
| 2007/0044768 A1 * | 3/2007 | Eick et al. ..................... 123/478 |
| 2008/0257066 A1 | 10/2008 | Hery et al. |

OTHER PUBLICATIONS

International Search Report for PCT/MY2012/000235; mailed Dec. 6, 2012.

* cited by examiner

*Primary Examiner* — Harshad R Patel
(74) *Attorney, Agent, or Firm* — Suzannah K. Sundby, Esq.; Canady + Lortz LLP

(57) ABSTRACT

An inferential Coriolis mass flowmeter characterized by: a power supply (10); a pressure sensor (11) connected to the power supply (10) and a tube of fluid; a current to voltage converter (13) connected to the pressure sensor (11) for converting a current signal from the pressure sensor (11) to a voltage signal; a controller unit (20) including an analogue to digital converter (21) connected to the current to voltage converter (13) for converting analogue signal from the current to voltage converter (13) to a digital signal, and a microprocessor (22) for processing the digital signal from the analogue to digital converter (21) to determine the mass flowrate of the fluid, wherein the microprocessor (22) is embedded with an algorithm to determine the mass flowrate of a fluid according to equation: $y=0.002x^4-0.0218x^3-0.0865x^2-0.8769x-0.0846$; a display panel (14) connected to the microprocessor (22); and a transmission circuit (15) connected to the microprocessor (22).

5 Claims, 3 Drawing Sheets

# INFERENTIAL CORIOLIS MASS FLOWMETER FOR DETERMINING A MASS FLOWRATE OF A FLUID BY USING ALGORITHM DERIVED PARTIALLY FROM CORIOLIS FORCE

BACKGROUND OF THE INVENTION

1. Field of the Invention

This invention relates to an inferential coriolis mass flowmeter, and more particularly to an inferential coriolis mass flowmeter for determining a mass flowrate of a fluid by using algorithm derived partially from Coriolis Force.

2. Description of Related Arts

A Coriolis mass flow rate measuring unit is a well-known device to measure flow rate of a liquid based on its mass. Coriolis Effect is used to measure the mass flow rate of a liquid. Coriolis Mass Flowmeter (CMF) is often used because CMF can measure flowrate more accurately without being affected by fluid density changes. Then the mass flow rate is converted to another well know unit such as volume flow rate. In industries especially oil and gas industry, Coriolis mass flow rate has been the most extensively used to measure flowrate within Coriolis Mass Flowmeter dispenser worldwide. Conventional CMF is manufactured bulky in size and the cost is usually higher due to its complex manufacturing process. External noise such as vibration is the major weakness in the conventional CMF. The accuracy of the conventional CMF is reduced when such noises are presence nearby.

GB Patent No. 2428090 (A) disclosed a flow meter that has a vibratable flowtube, a sensor connected to the flowtube for sensing motion of the flowtube and a driver connected to the flowtube to drive the flowtube. Random frequency signals are generated by a random frequency signal generator, and the signals are sent to the driver during a first mode of operation of the flowmeter. A second mode of operation may be carried out using a second drive signal. The flowmeter can measure mass flow rate or density of the fluid. A temperature or pressure sensor may be provided. The cited patent includes additional parts such as sensors and random frequency signal generator to enhance the accuracy of measuring the mass flow rate of a liquid. Additional partrenders complex design and complex manufacturing process which resulting higher cost.

U.S. Pat. No. 6,868,740 B2 disclosed a Coriolis mass flow meter that uses a measuring line attached with a tension sensor to record the mechanical tension of the measuring line. The tension sensor is connected to a pressure signal output facility to transmit a tension signal. A pressure signal is determined based on the tension signal generated by the pressure signal output facility. The cited patent is basically using a tension sensor to detect pressure difference of the measuring line. The result obtained is directly from the output signal of the tension sensor which may not be accurate especially when there are external factors such as temperature and liquid composition may involve.

U.S. Pat. No. 5,594,180 disclosed a device and method for detecting and correcting various fault conditions in an operating Coriolis mass flow meter. In this patent, information from a Coriolis mass flow meter is received and compared to threshold signatures representing various fault conditions. When a fault condition is detected, output signals inform an operator and control the mass flow rate to correct the fault condition. Particularly, the invention of the cited patent relates to detecting cracks in flow tubes to stop the flow of material through cracked flow tubes. The cited invention also detects the void fraction of material flowing through the tubes, determines a corrected actual mass flow rate and controls the mass flow rate to compensate for the void fraction. However, the cited patent is still using conventional Coriolis Effect in which the result can be affected by external noises such as vibration.

US Patent Publication No. 2007/0017304 A1 disclosed a Coriolis mass flow meter. This patent has at least one oscillator and sensor mounted on a Coriolis measuring tube for detecting Coriolis forces and oscillations from Coriolis forces. The cited patent provides means to detect zero flow in the measuring tube regardless of detection of Coriolis forces and oscillations from Coriolis forces. The means can be a sensor for measuring a flow according to a magnetic-inductive measuring method, the method for measuring the difference in propagation time or the Doppler method with aid of noise signals, a differential pressure method, a calorimetric method and a float-type measuring method. This patent is developed from a conventional CMF which uses mass flow rate basis.

Accordingly, it can be seen in the prior arts that there exists a need to provide a flowmeter which can easily manufacture and smaller in size without jeopardizing the measurement accuracy.

SUMMARY OF INVENTION

It is an objective of the present invention to provide an inferential Coriolis mass flowmeter.

It is also an objective of the present invention to provide an algorithm derived partially from Coriolis Force embedded into a processor.

It is yet another objective of the present invention to provide a reconstructed algorithm by adding variables such as temperature, humidity and type of fluid which depends on the surrounding application of the inferential coriolis mass flowmeter.

Accordingly, these objectives may be achieved by following the teachings of the present invention. The present invention relates to an inferential coriolis mass flowmeter characterized by: a power supply; a pressure sensor connected to the power supply and a tube of fluid; a current to voltage converter connected to the pressure sensor for converting a current signal from the pressure sensor to a voltage signal; a controller unit including an analogue to digital converter connected to the current to voltage converter for converting analogue signal from the current to voltage converter to a digital signal, and a microprocessor for processing the digital signal from the analogue to digital converter to determine the mass flowrate of the fluid, wherein said microprocessor is embedded with an algorithm to determine the mass flowrate of a fluid according to equation (1): $y=0.002x^4-0.0218x^3+0.0865x^2+0.8769x+0.0846$; a display panel connected to the microprocessor; and a transmission circuit connected to the microprocessor.

BRIEF DESCRIPTION OF THE DRAWINGS

The features of the invention will be more readily understood and appreciated from the following detailed description when read in conjunction with the accompanying drawings of the preferred embodiment of the present invention, in which.

DETAILED DESCRIPTION OF THE INVENTION

Figure 1:
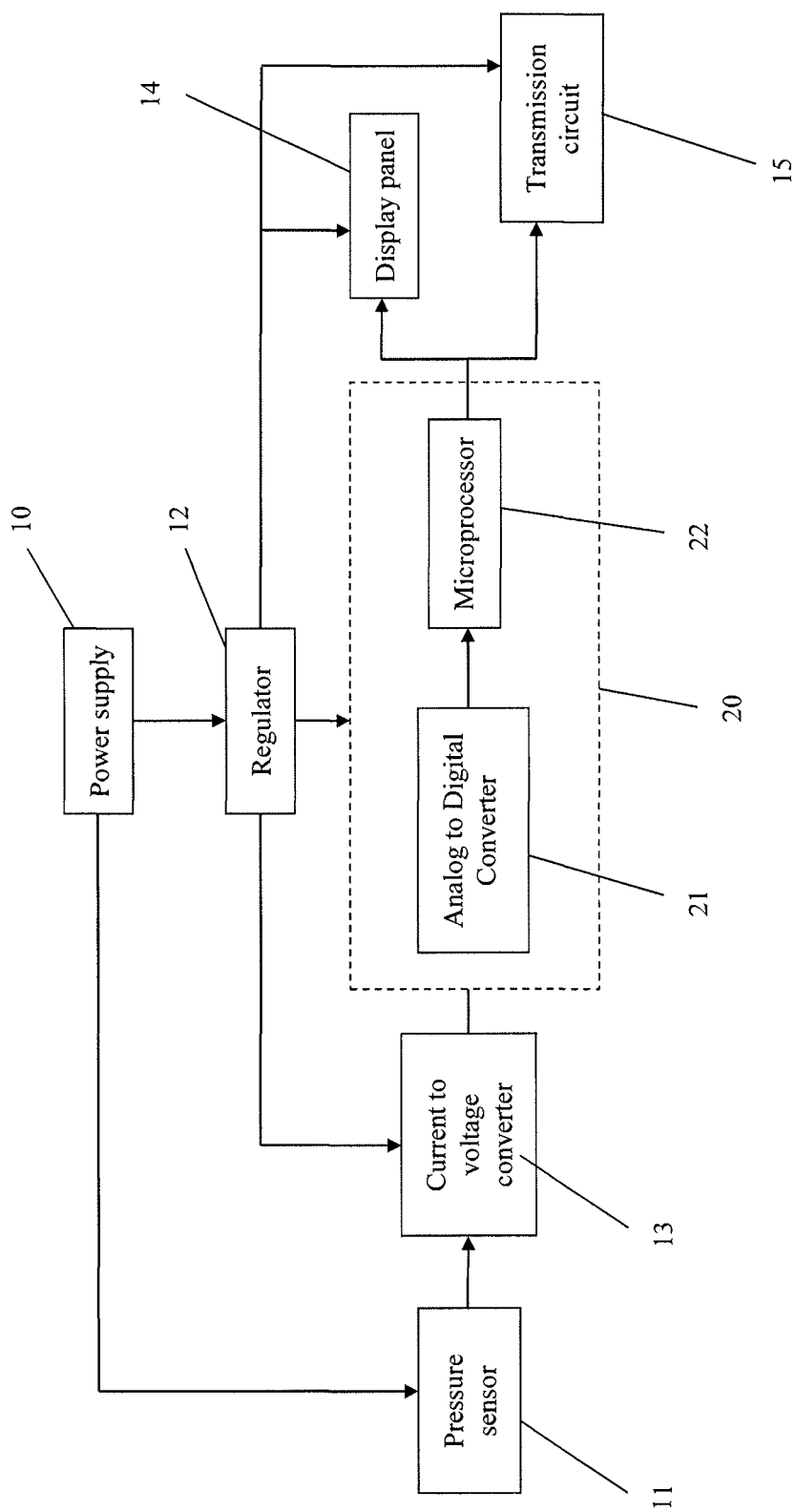
FIG. 1 is a block diagram of an inferential coriolis mass flowmeter.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting but merely as a basis for claims. It should be understood that the drawings and detailed description thereto are not intended to limit the invention to the particular form disclosed, but on the contrary, the invention is to cover all modification, equivalents and alternatives falling within the scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the words "a" or "an" mean "at least one" and the word "plurality" means one or more, unless otherwise mentioned. Where the abbreviations of technical terms are used, these indicate the commonly accepted meanings as known in the technical field. For ease of reference, common reference numerals will be used throughout the figures when referring to the same or similar features common to the figures. The present invention will now be described with reference to FIGS. 1-3.

The present invention relates to an inferential coriolis mass flowmeter characterized by:

a power supply (10);

a pressure sensor (11) connected to the power supply (10) and a tube of fluid for sensing the change of pressure of the fluid within the tube;

a current to voltage converter (13) connected to the pressure sensor (11) for converting a current signal from the pressure sensor (11) to a voltage signal;

a controller unit (20) including an analogue to digital converter (21) connected to the current to voltage converter (13) for converting analogue signal from the current to voltage converter (13) to a digital signal, and a microprocessor (22) for processing the digital signal from the analogue to digital converter (21) to determine the mass flowrate of the fluid, wherein said microprocessor (22) is embedded with an algorithm to determine the mass flowrate of a fluid according to equation (1):

$$y = 0.002x^4 - 0.0218x^3 + 0.0865x^2 + 0.8769x + 0.0846 \quad (1)$$

wherein $R^2 = 1$ and wherein:

y is a mass flowrate of the fluid, x is a pressure value detected by the pressure sensor.

a display panel (14) connected to the microprocessor (22) for displaying the result processed by the microprocessor (22); and a transmission circuit (15) connected to the microprocessor (22) for exporting the result processed by the microprocessor (22) to an external devices.

In a preferred embodiment of the inferential coriolis mass flowmeter, the controller unit (20) is a Peripheral Interface Controller (PIC). The preferred model type of the PIC is PIC16F877 controller which has a built-in analogue to digital converter capabilities. If the supply voltage exceeds voltage requirement of the PIC16F877 controller, a voltage regulator chip such as type LM7805 is used to step down the voltage, for example from 24 voltage to 5 voltage.

In a preferred embodiment of the inferential coriolis mass flowmeter, the PIC is reprogrammable to add variables for, example type of fluid, climate, surrounding pressure and humidity, to the algorithm. The PIC16F877 controller can easily be reprogrammed and erased to add variables as needed.

In a preferred embodiment of the inferential coriolis mass flowmeter, the transmission circuit (15) is a serial communication circuit. The preferred serial communication type is RS232 which allow data to be sent and received between the PIC and a personal computer. The motive of constructing the transmission circuit (15) is due to the need for data logging for troubleshooting.

In a preferred embodiment of the inferential coriolis mass flowmeter, a regulator (12) is connected to the power supply (10) for regulating the current from the power supply (10) to the current-voltage converter (13), the controller unit (20), the display panel (14) and the communication circuit (15).

The current to voltage converter (13) is connected to the pressure sensor (11) to convert the current produced from the pressure sensor (11). However, the current to voltage converter (13) can be removed if the pressure sensor (11) output is voltage instead of current.

Figure 2:
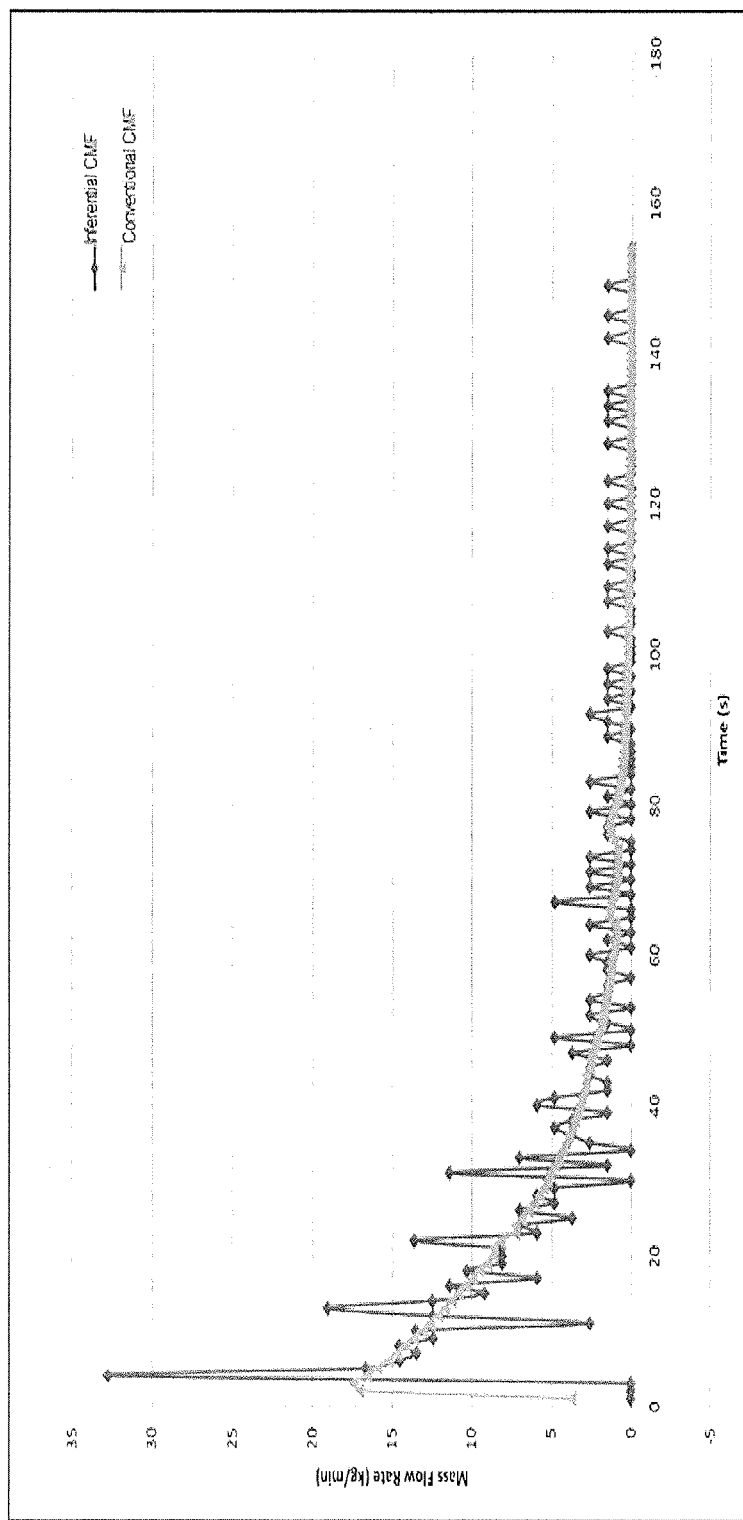
FIG. 2 is a graph of comparison between data of coriolis mass flowmeter (simulated by Ni-FieldPoint) and data of inferential coriolis mass flowmeter (simulated by Peripheral Interface Controller).

The predetermined equation (1) is preferably applied to the flowmeter calibrated in a controlled laboratory environment for Compressed Natural Gas (CNG). For practical setup, the inferential coriolis mass flowmeter needs to be calibrated according to the type of fluid, climate, surrounding pressure and humidity. To enhance the accuracy and compensate the analogue to digital converter (21) error, the output of the analogue to digital converter (21) is to be calibrated. The calibration can be made by multiplying the output of the PIC with a suitable mathematical function. The mathematical function could be developed by estimating coefficients obtained using interpolation of voltage, V from a Ni-FieldPoint against voltage, V developed by the PIC as shown in FIG. 2. The Ni-FieldPoint is developed from a data of a conventional Coriolis Mass Flowmeter (CMF).

Below is an example of calculation the pressure of the inferential coriolis mass flowmeter from which the advantages of the present invention may be more readily understood. It is to be understood that the following example is for illustrative purpose only and should not be construed to limit the present invention in any way.

EXAMPLES

In this example, the pressure sensor (11) produces a current signal which should be converted to a voltage signal. The pressure sensor (11) produces a current signal range from 4 to 20 mA to flow through a 240Ω resistor the current to voltage converter (13). The sensing range of the pressure sensor is from 0 to 5000 psi. The analogue to digital converter only requires 0-5V input. The liquid type is Compressed Natural Gas (CNG)

The voltage generated across the resistor can be calculated by using Ohm's Law.

$$V = IR. \quad (2)$$

wherein:

V is voltage generated across the 240Ω resistor,

I is current output by the pressure sensor (11) and

R is resistance.

When no pressure is detected, 4 mA current is the output from the pressure sensor (11) and passes through the 240Ω resistor. The voltage across the 240Ω resistor is defined as:

$$V_{4\,mA} = (0.004)(240) = 0.96V.$$

When maximum 5000 psi of pressure is detected, 20 mA of current is the output from the transducer. The voltage across the 240Ω resistor would be:

$$V_{20\,mA}=(0.02)(240)=4.8V. \quad (2)$$

Hence, the voltage generated across the 240Ω resistor by the current 4-20 mA is in the range of 0.96-4.8V, which could be handled by the analogue to digital converter (21).

The maximum analogue to digital converter (21) resolution for PIC16F877A is 10 bit. 10 bit analogue to digital converter (21) would give a maximum of $2^{10}+1=1024$ values. Since the entire analogue to digital converter (21) range is 0-5V, then if 5V is connected to the analogue to digital converter (21) input, the analogue to digital converter (21) conversion result would be 1024.

Assuming 'X' is the signal value from the current to voltage converter (13) and received by the analogue to digital converter (21), $$\text{Voltage}=X*5/1024. \quad (3)$$

Figure 3:
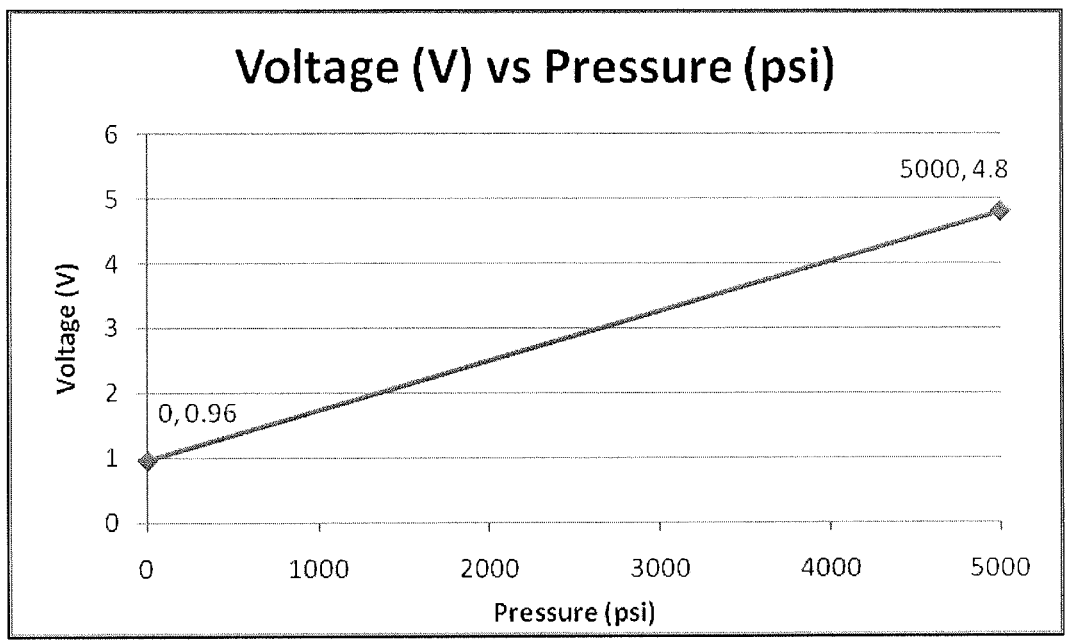
FIG. 3 is a graph of voltage against pressure read by Peripheral Interface Controller.

To obtain the pressure value, the linear relationship which is the gradient value between voltage and pressure within FIG. 3 must be calculated.

The pressure of the CNG can be calculated according to formulas (4) and (5):

$$\text{Gradient} = \frac{4.8-0.96}{5000-0} \quad (4)$$
$$\text{Gradient} = 7.68*10^{-4}$$

$$\text{Pressure(psi)} = \frac{\text{voltage}-0.96}{7.68*10^{-4}} \quad (5)$$

wherein voltage is voltage from equation (3).

If the analogue to digital converter (21) result changes by 1, it means that the pressure would change by 5000/1024=4.88 psi. This shows the maximum resolution of pressure that could be measured is about 5 psi.

Using the pressure value obtained from equation (5) the microprocessor to solves equation (1) to obtain mass flowrate of the CNG.

$$y=0.002x^4-0.0218x^3+0.0865x^2+0.8769x+0.0846$$

wherein $R^2=1$ and wherein:
y is a mass flowrate of the fluid,
x is a pressure value detected by the pressure sensor.

Although the present invention has been described with reference to specific embodiments, also shown in the appended figures, it will be apparent for those skilled in the art that many variations and modifications can be done within the scope of the invention as described in the specification and defined in the following claims.

Description of the reference numerals used in the accompanying drawings according to the present invention:

| Reference Numerals | Description |
|---|---|
| 10 | Power Supply |
| 11 | Pressure sensor |
| 12 | Regulator |
| 13 | Current to voltage converter |
| 14 | Display panel |
| 15 | Transmission circuit |
| 20 | Controller unit |
| 21 | Analogue to digital converter |
| 22 | Microprocessor |

I claim:

1. An inferential Coriolis mass flowmeter characterized by:
a power supply (10);
a pressure sensor (11) connected to the power supply (10) and a tube of fluid for sensing the change of pressure of the fluid within the tube;
a current to voltage converter (13) connected to the pressure sensor (11) for converting a current signal from the pressure sensor (11) to a voltage signal;
a controller unit (20) including an analogue to digital converter (21) connected to the current to voltage converter (13) for converting analogue signal from the current to voltage converter (13) to a digital signal, and a microprocessor (22) for processing the digital signal from the analogue to digital converter (21) to determine the mass flowrate of the fluid, wherein said microprocessor (22) is embedded with an algorithm to determine the mass flowrate of a fluid according to equation:

$$y=0.002x^4-0.0218x^3+0.0865x^2+0.8769x+0.0846 \quad (1)$$

and wherein:
y is a mass flowrate of the fluid,
x is a pressure value detected by the pressure sensor;
a display panel (14) connected to the microprocessor (22) for displaying the result processed by the microprocessor (22); and
a transmission circuit (15) connected to the microprocessor (22) for exporting the result processed by the microprocessor (22) to external devices.

2. An inferential coriolis mass flowmeter according to claim 1, wherein the controller unit (20) is a Peripheral Interface Controller.

3. An inferential coriolis mass flowmeter according to claim 2, wherein the Peripheral Interface Controller is reprogrammable to add variables, for example type of fluid, climate, surrounding pressure and humidity, to the algorithm.

4. An inferential coriolis mass flowmeter according to claim 1, wherein the transmission circuit (15) is a serial communication circuit.

5. An inferential coriolis mass flowmeter according to claim 1, wherein a regulator (12) is connected to the power supply (10) for regulating the current from the power supply (10) to the current-voltage converter (13), the controller unit (20), the display panel (14) and the communication circuit (15).

* * * * *